United States Patent [19]

Dolle et al.

[11] Patent Number: 5,216,095

[45] Date of Patent: Jun. 1, 1993

[54] PROCESS FOR THE PREPARATION OF A POLYOLEFIN

[75] Inventors: Volker Dolle, Kelkheim/Taunus; Martin Antberg, Hofheim am Taunus; Jürgen Rohrmann, Liederbach; Andreas Winter, Kelkheim/Taunus, all of Fed. Rep. of Germany

[73] Assignee: Hoechst Aktiengesellschaft, Frankfurt am Main, Fed. Rep. of Germany

[21] Appl. No.: 697,771

[22] Filed: May 9, 1991

[30] Foreign Application Priority Data

May 12, 1990 [DE] Fed. Rep. of Germany ....... 4015254

[51] Int. Cl.⁵ .................. C08F 4/642; C08F 10/00
[52] U.S. Cl. .................... 526/127; 502/117; 526/119; 526/160; 526/351
[58] Field of Search ............. 526/114, 160, 119, 127

[56] References Cited

U.S. PATENT DOCUMENTS

| | | | |
|---|---|---|---|
| 4,522,982 | 6/1985 | Ewen | 526/160 |
| 4,530,914 | 7/1985 | Ewen et al. | 526/114 |
| 4,769,510 | 9/1988 | Kaminsky et al. | |
| 4,931,417 | 6/1990 | Miya et al. | 526/351 |
| 4,975,403 | 12/1990 | Ewen | 526/127 |

FOREIGN PATENT DOCUMENTS 3726067  2/1989  Fed. Rep. of Germany.
88-5769  4/1989  South Africa.

Primary Examiner—Edward J. Smith
Attorney, Agent, or Firm—Connolly & Hutz

[57] ABSTRACT

Olefins of the formula $$R^{11}-CH=CH-R^{12}$$

($R^{11}$ and $R^{12}$ = H or $C_1$-$C_{14}$-alkyl) are polymerized in the presence of a catalyst comprising at least one metallocene of the formula I

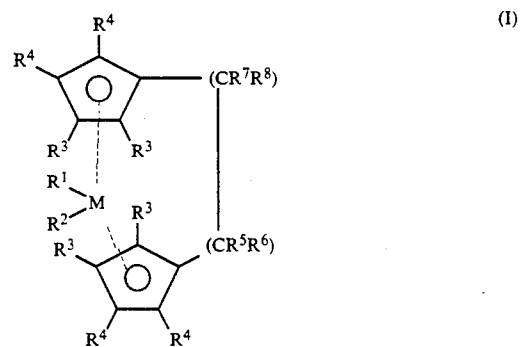

(M = zirconium or hafnium) and an aluminoxane, giving polymers of high molecular weight in high yield.

4 Claims, No Drawings

PROCESS FOR THE PREPARATION OF A POLYOLEFIN

The invention relates to a process for the preparation of a 1-olefin polymer, specifically a bimodal propylene polymer of high isotacticity and molecular weight and of polydispersity, molecular weight distribution and separation between the molecular weight maximum which are substantially independent of the polymerization temperature.

Isotactic PP is prepared by suspension polymerization with the aid of ethylene bis(4,5,6,7)tetrahydro-1-indenyl)zirconium dichloride together with an aluminoxane (cf. U.S. Pat. No. 4,769,510). The polymer has a narrow molecular weight distribution ($M_w/M_n$ of from 1.6 to 2.6).

By means of a special preactivation method, it is has been possible to achieve a considerable increase in the activity of the catalyst system (cf. DE 3 726 067). The grain morphology of the polymer has likewise been improved by this preactivation method.

The molecular weights of the polymers obtained in accordance with these two applications are still too low for industrial use.

The object was thus to find a process for the preparation of a high-molecular-weight, isotactic, bimodal olefin polymer which can be carried out in an industrially useful temperature range with high catalyst activity.

It has been found that the object can be achieved by polymerizing olefins in the presence of certain metallocene catalysts.

The invention thus relates to a process for the preparation of a polyolefin by polymerizing an olefin of the formula $R^{11}$—CH=CH—$R^{12}$ in which $R^{11}$ and $R^{12}$ are identical or different and are a hydrogen atom or a $C_1$-$C_{14}$-alkyl radical or $R^{11}$ and $R^{12}$, together with the carbon atom connecting them, form a ring having 4 to 28 carbon atoms, at a temperature of from 0° C. to 150° C., at a pressure of from 0.5 to 100 bar, in solution, in suspension or in the gas phase, in the presence of a catalyst which comprises a metallocene and an aluminoxane of the formula (II)

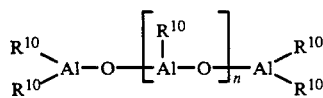

(II)

for the linear type and/or of the formula (III)

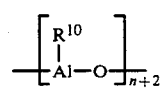

(III)

for the cyclic type, where, in the formulae (II) and (III), the radicals $R^{10}$ are identical or different and are hydrogen, a $C_1$-$C_6$-alkyl group, phenyl or benzyl, and n is an integer from 2 to 50, wherein the metallocene is a compound of the formula (I)

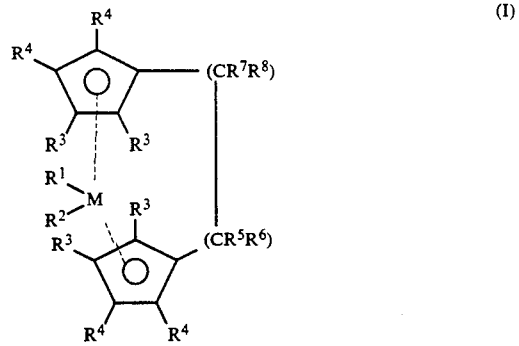

(I)

in which
M is zirconium or hafnium, $R^1$ and $R^2$ are identical or different and are a hydrogen atom, a $C_1$-$C_{10}$-alkyl group, a $C_1$-$C_{10}$-alkoxy group, a $C_6$-$C_{10}$-aryl group, a $C_6$-$C_{10}$-aryloxy group, a $C_2$-$C_{10}$-alkenyl group, a $C_7$-$C_{40}$-arylalkyl group, a $C_7$-$C_{40}$-alkylaryl group, a $C_8$-$C_{40}$-arylalkenyl group or a halogen atom, $R^3$ and $R^4$ are identical or different and are a hydrogen atom, a halogen atom or a $C_1$-$C_{10}$-alkyl group, or any two adjacent radicals $R^3$ and $R^4$, together with the carbon atoms connecting them, form a ring, $R^5$, $R^6$, $R^7$ and $R^8$ are identical or different and are a hydrogen atom, a halogen atom, a $C_1$-$C_{30}$-alkyl group, a $C_1$-$C_{10}$-fluoroalkyl group, a $C_6$-$C_{10}$-aryl group, a $C_6$-$C_{10}$-fluoroaryl group, a $C_1$-$C_{10}$-alkoxy group, a $C_2$-$C_{10}$-alkenyl group, a $C_7$-$C_{40}$-arylalkyl group, a $C_8$-$C_{40}$-arylalkenyl group, an —SiMe$_3$ group, an —OSiMe$_3$ group or a —CH$_2$—SiMe$_3$ group, or $R^5$ and $R^6$ or $R^7$ and $R^8$, in each case together with the atoms connecting them, form a ring, and the compound of the formula I is in the form of at least two of its stereoisomers originating from the metallocene preparation.

The catalyst to be used for the process according to the invention comprises an aluminoxane and a metallocene of the formula I

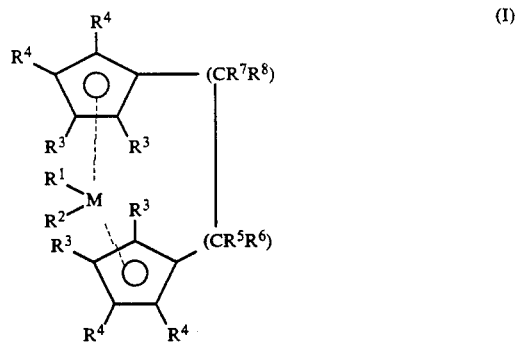

(I)

in which
M is hafnium or zirconium, preferably zirconium,
$R^1$ and $R^2$ are identical or different and are a hydrogen atom, a $C_1$-$C_{10}$-alkyl group, preferably a $C_1$-$C_3$-alkyl group, a $C_1$-$C_{10}$-alkoxy group, preferably a $C_1$-$C_3$-alkoxy group, a $C_6$-$C_{10}$-aryl group, preferably a $C_6$-$C_8$-aryl group, a $C_6$-$C_{10}$-aryloxy group, preferably a $C_6$-$C_8$-aryloxy group, a $C_2$-$C_{10}$-alkenyl group, preferably a $C_2$-$C_4$-alkenyl group, a $C_7$-$C_{40}$-arylalkyl group, preferably a $C_7$-$C_{10}$-arylalkyl group, a $C_7$-$C_{40}$-alkylaryl group, preferably a $C_7$-$C_{12}$-alkylaryl group, a $C_8$-$C_{40}$- arylalkenyl group, preferably a $C_8$-$C_{12}$-arylalkenyl group, or a halogen atom, preferably chlorine.

$R^3$ and $R^4$ are identical or different and are a hydrogen atom, a halogen atom, preferably a fluorine, chlorine or bromine atom, or a $C_1$-$C_{10}$-alkyl group, preferably a $C_1$-$C_3$-alkyl group, or any two adjacent radicals $R^3$ and $R^4$, together with the carbon atoms connecting them, form a ring. Particularly preferred ligands are indenyl, fluorenyl and cyclopentadienyl.

$R^5$, $R^6$, $R^7$ and $R^8$ are identical or different and are a hydrogen atom, a halogen atom, a $C_1$-$C_{30}$-alkyl group, preferably a $C_1$-$C_4$-alkyl group, in particular a methyl or ethyl group, a $C_1$-$C_{10}$-fluoroalkyl group, preferably a $CF_3$ group, a $C_6$-$C_{10}$-fluoroaryl group, preferably a pentafluorophenyl group, a $C_6$-$C_{19}$-aryl group, preferably a $C_6$-$C_8$-aryl group, in particular —$CH_2$—$C_6H_5$ or —$C_6H_5$, a $C_1$-$C_{10}$-alkoxy group, preferably a $C_1$-$C_4$-alkoxy group, in particular a methoxy group, a $C_2$-$C_{10}$-alkenyl group, preferably a $C_2$-$C_4$-alkenyl group, a $C_7$-$C_{40}$-arylalkyl group, preferably a $C_7$-$C_{10}$-arylalkyl group, a $C_8$-$C_{40}$-arylalkenyl group, preferably a $C_8$-$C_{12}$-arylalkenyl group, an —$SiMe_3$ group, an —$OSiMe_3$ group or a —$CH_2$—$SiMe_3$ group, preferably a —$CH_2$—$SiMe_3$ group, or $R^5$ and $R^6$ or $R^7$ and $R^8$, in each case together with the atoms connecting them, form a ring. The metallocene of the formula I is in the form of its stereoisomers.

It is very particularly preferred for one of the radicals $R^5$, $R^6$, $R^7$ and $R^8$ to be the —$CH_2$—$SiMe_3$ group, each of the other three radicals being a hydrogen atom.

The above-described metallocenes can be prepared in accordance with the general reaction scheme below:

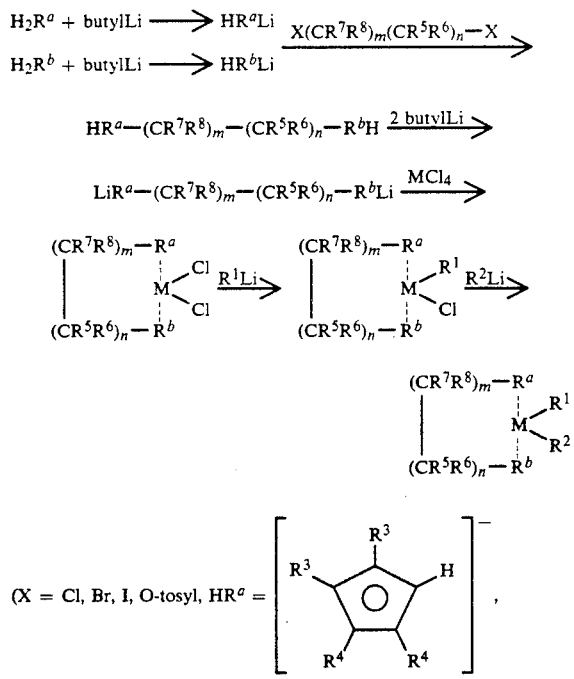

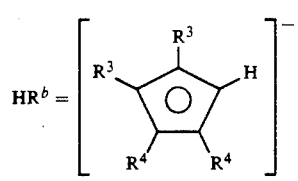

The cocatalyst is an aluminoxane of the formula II

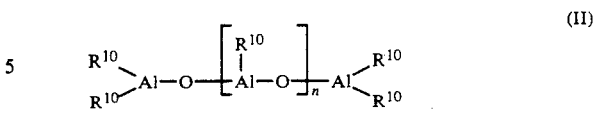

for the linear type and/or of the formula (III)

for the cyclic type. In these formulae, $R^{10}$ is preferably a $C_1$-$C_6$-alkyl group, preferably methyl, ethyl or isobutyl, in particular methyl, and n is an integer from 2 to 50, preferably from 5 to 40. However, the exact structure of the aluminoxane is not known.

The aluminoxane can be prepared in various ways. Examples are given below, in particular, for the preparation of aluminoxanes where $R^{10}$=alkyl. Compounds where $R^{10}\neq$alkyl can be prepared analogously from corresponding starting compounds.

One possibility is the careful addition of water to a dilute solution of a trialkylaluminum by introducing the solution of the trialkylaluminum, preferably trimethylaluminum, and the water, in each case in small portions, into a relatively large amount of an inert solvent, awaiting the cessation of gas evolution between the addition of each portion.

In another process, finely powdered copper sulfate pentahydrate is slurried in toluene, and sufficient trialkylaluminum to provide about 1 mol of $CuSO_4.5H_2O$ for every 4 Al atoms is added at about $-20°$ C. under an inert gas in a glass flask. After slow hydrolysis with elimination of alkane, the reaction mixture is left at room temperature for from 24 to 48 hours, during which it may be necessary to cool the mixture so that the temperature does not exceed 30° C. The copper sulfate is subsequently filtered off from the aluminoxane dissolved in the toluene, and the solution is evaporated in vacuo. It is assumed that, in this preparation process, the low-molecular-weight aluminoxanes condense with elimination of trialkylaluminum to form higher oligomers.

Aluminoxanes are furthermore obtained if trialkylaluminum, preferably trimethylaluminum, dissolved in an inert aliphatic or aromatic solvent, preferably heptane or toluene, is reacted at a temperature of from $-20°$ to 100° C. with aluminum salts, preferably aluminum sulfate, containing water of crystallization. In this reaction, the volume ratio between the solvent and the alkylaluminum used is from 1:1 to 50:1, preferably 5:1, and the reaction time, which can be monitored through the elimination of the alkane, is from 1 to 200 hours, preferably from 10 to 40 hours.

The aluminum salts containing water of crystallization are in particular those which have a high content of water of crystallization. Particular preference is given to aluminum sulfate hydrate, in particular the compounds $Al_2(SO_4)_3.16H_2O$ and $Al_2(SO_4)_3.18H_2O$ having the particularly high water of crystallization content of 16 and 18 mol of $H_2O$/mol of $Al_2(SO_4)_3$ respectively.

A further variant of the preparation of aluminoxanes comprises dissolving trialkylaluminum, preferably trimethylaluminum, in the suspending agent, preferably in the liquid monomer, heptane or toluene, in the polymerization reactor and then reacting the aluminum compound with water.

In addition to the above-outlined process for the preparation of aluminoxanes, it is possible to use other processes.

Irrespective of the preparation method, all the aluminoxane solutions have a varying content of unreacted trialkylaluminum, in free form or as an adduct.

It is possible to preactivate the metallocene, before use in the polymerization reaction, using an aluminoxane of the formula (II) and/or (III). This considerably increases the polymerization activity and improves the grain morphology.

The preactivation of the transition-metal compound is carried out in solution. The metallocene is preferably dissolved in a solution of the aluminoxane in an inert hydrocarbon. Suitable inert hydrocarbons are aliphatic or aromatic hydrocarbon. Toluene is preferred. The concentration of the aluminoxane solution is in the range from about 1% by weight to the saturation limit, preferably from 5 to 30% by weight, in each case based on the overall solution. The metallocene can be employed in the same concentration, but is preferably employed in an amount of from $10^{-4}-1$ mol per mol of aluminoxane. The preactivation time is from 5 minutes to 60 hours, preferably from 5 to 60 minutes. A temperature of from $-78°$ C. to $100°$ C., preferably from $0°$ to $70°$ C., is used.

The polymerization is carried out in a known manner in solution, in suspension or in the gas phase, continuously or batchwise, in one or more steps, at a temperature of from $0°$ to $150°$ C., preferably from $30°$ to $80°$ C. Olefins of the formula $R^{11}$—CH=CH—$R^{12}$ are polymerized. In this formula, $R^{11}$ and $R^{12}$ are identical or different and are a hydrogen atom or an alkyl radical having 1 to 28 carbon atoms. However, $R^{11}$ and $R^{12}$ may also, together with the carbon atoms connecting them, form a ring having 4 to 28 carbon atoms. Examples of such olefins are ethylene, propylene, 1-butene, 1-hexene, 4-methyl-1-pentene, 1-octene, norbornene or norbornadiene. In particular, propylene is polymerized.

The molecular weight regulator added, if necessary, is hydrogen. The total pressure in the polymerization system is from 0.5 to 100 bar. The polymerization is preferably carried out in the industrially particularly useful pressure range of from 5 to 64 bar.

The metallocene is used in a concentration, based on the transition metal, of from $10^{-3}$ to $10^{-7}$ mol, preferably from $10^{-4}$ to $10^{-6}$ mol, of transition metal per dm$^3$ of solvent or per dm$^3$ of reactor volume. The aluminoxane is used in a concentration of from $10^{-5}$ to $10^{-1}$ mol, preferably from $10^{-4}$ to $10^{-2}$ mol, per dm$^3$ of solvent or per dm$^3$ of reactor volume. In principle, however, higher concentrations are also possible.

The metallocene employed is a compound of the formula I, in the form of at least two of its stereoisomers originating from the metallocene preparation.

If the polymerization is carried out as a suspension or solution polymerization, an inert solvent which is customary for the Ziegler low-pressure process is used. For example, the polymerization is carried out in an aliphatic or cycloaliphatic hydrocarbon; examples which may be mentioned are butane, pentane, hexane, heptane, isooctane, cyclohexane and methylcyclohexane.

In addition, a petroleum or hydrogenated diesel oil fraction can be used. It is also possible to use toluene.

The polymerization is preferably carried out in liquid monomer.

If inert solvents are used, the monomers are metered in in gas or liquid form.

The polymerization can be carried out for as long as desired since the catalyst system to be used according to the invention exhibits only a slight time-dependent drop in polymerization activity.

The process according to the invention is distinguished by the fact that the metallocenes used are very temperature-stable, so that they can be used with high activity even at temperatures up to $90°$ C. In addition, the aluminoxanes serving as cocatalysts can be added in lower concentrations than hitherto.

The metallocene mixture to be used according to the invention has the advantage over the prior art of being produced together in one synthesis operation, which saves time, space, equipment and solvent. It contains compounds which are able to polymerize 1-olefins, particularly propylene, to give polymers having a molecular weight $M_w$ of greater than 70,000 g/mol. This is confirmed by the molecular weight distribution, which has a high $M_w/M_n$ ratio ($>2$). The molecular weight distribution is bimodal.

EXAMPLE 1

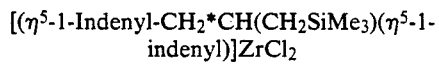

14 cm$^3$ of a 1.6N (22.4 mmol) butyllithium/hexane solution were added dropwise over the course of 1 hour at room temperature to 12.2 g (42.6 mmol) of the ligand (diastereomer mixture) in 50 cm$^3$ of THF, and the batch was stirred at $60°$ C. until 0.5 hour after cessation of the evolution of butane.

The dilithio salt solution obtained was added dropwise, simultaneously with a solution of 4.21 g (11.16 mmol) of ZrCl$_4$(thf)$_2$ in 80 cm$^3$ of THF, at ambient temperature over the course of 1 hour to 30 cm$^3$ of THF. The batch was then stirred at room temperature for 8 hours and evaporated. The salts deposited initially during the evaporation were filtered off, and the batch was finally evaporated to dryness. The residue was suspended in n-pentane and separated off. The solid was subsequently taken up in ether, the ether-soluble components were separated off by filtration, and the ether was stripped off, leaving 38 g (5.94 mmol, 53%) of a yellow powder, whose NMR spectrum showed the presence of a complex mixture of at least three compounds. The elemental analysis had the following results:

C 55.8 (calc. 57.12), H 5.4 (calc. 5.19) and Cl 14.1 (calc. 14.05), all in %.

EXAMPLES 2 TO 5

A dry 16 dm$^3$ reactor was flushed with nitrogen and charged with 10 dm$^3$ of liquid propylene. Two-thirds of the amount of methylaluminoxane (MAO) indicated in the table for each experiment were then added as a toluene solution, and the batch was stirred at $30°$ C. for 15 minutes.

In parallel, a solution of the metallocene was prepared in one third of the amount of MAO in the table, and was preactivated by being left to stand for 15 minutes.

This solution was then introduced into the reactor. The polymerization system was heated to the appropriate polymerization temperature, and the polymerization was initiated. The polymerization was terminated after 60 minutes by cooling the reactor and decompressing the contents. The polymer yield obtained and the analytical data determined are shown in the table.

The following abbreviations have been used in the table:

VN=viscosity number in cm$^3$/g,
$M_w$=weight average molecular weight in g/mol,
$M_w/M_n$=polydispersity, determined by gel permeation chromatography (GPC)

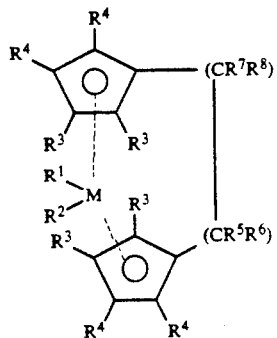

| Polymerization experiments using [(IND)—CH*CH$_2$SiMe$_3$—CH$_2$—(IND)]ZrCl$_2$ | | | | | | | | | | | |
|---|---|---|---|---|---|---|---|---|---|---|---|
| Temperature [°C.] | Amount of catalyst [mg] | Catalyst molecular weight [g/mol] | Amount of activator [cm$^3$] | MAO [%] | [mmol] | Yield [kg] | Activity [kg of PP/g of catalyst/h] | Bulk density [g/dm$^3$] | VZ [cm$^3$/g] | $M_w$ [g/mol] | $M_w/M_n$ |
| 40 | 19.9 | 504.5 | 40.2 | 10.0 | 60 | 0.140 | 7.0 | 101 | 89 | 70700 | 7.3 |
| 50 | 13.9 | 504.5 | 40.2 | 10.0 | 60 | 0.880 | 63.1 | 183 | 81 | 59300 | 8.5 |
| 60 | 19.8 | 504.5 | 40.2 | 10.0 | 60 | 1.280 | 129.1 | 264 | 77 | 58200 | 5.9 |
| 70 | 6.0 | 504.5 | 40.2 | 10.0 | 60 | 1.040 | 172.2 | 246 | 55 | 43300 | 6.9 |

We claim:

1. A process for the preparation of a polyolefin by polymerizing an olefin of the formula $R^{11}$—CH=CH—$R^{12}$ in which $R^{11}$ and $R^{12}$ are identical or different and are a hydrogen atom or a $C_1$-$C_{14}$-alkyl radical or $R^{11}$ and $R^{12}$, together with the carbon atom connecting them, form a ring having 4 to 28 carbon atoms, at a temperature of from 0° C. to 150° C., at a pressure of from 0.5 to 100 bar, in solution, in suspension or in the gas phase, in the presence of a catalyst which comprises a metallocene and an aluminoxane of the formula (II)

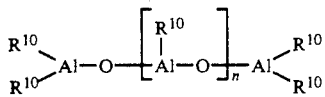

(II)

for the linear type and/or of the formula (III)

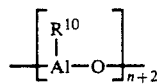

(III)

for the cyclic type, where, in the formulae (II) and (III), the radicals $R^{10}$ are identical or different and are hydrogen, a $C_1$-$C_6$-alkyl group, phenyl or benzyl, and n is an integer from 2 to 50, wherein the metallocene is a compound of the formula (I)

in which

M is zirconium or hafnium, $R^1$ and $R^2$ are identical or different and are a hydrogen atom, a $C_1$-$C_{10}$-alkyl group, a $C_1$-$C_{10}$-alkoxy group, a $C_6$-$C_{10}$-aryl group, a $C_6$-$C_{10}$-aryloxy group, a $C_2$-$C_{10}$-alkenyl group, a $C_7$-$C_{40}$-arylalkyl group, a $C_7$-$C_{40}$-alkylaryl group, a $C_8$-$C_{40}$-arylalkenyl group or a halogen atom, $R^3$ and $R^4$ are identical or different and are a hydrogen atom, a halogen atom or a $C_1$-$C_{10}$-alkyl group, or any two adjacent radicals $R^3$ and $R^4$, together with the carbon atoms connecting the, for a ring, a radical from the group consisting of $R^5$, $R^6$, $R^7$ and $R^8$ is a —CH$_2$—SiMe$_3$ group and each of the other radicals of the group is a hydrogen atom, and the compound of the formula I is in the form of at least two of its stereoisomers originating from the metallocene preparation.

2. The process as claimed in claim 1, wherein propylene is polymerized.

3. The process as claimed in claim 1, wherein the metallocene is {($\eta^5$-1-indenyl-CH$_2$*CH(CH$_2$SiMe$_3$)($\eta^5$-1-indenyl)}ZrCl$_2$.

4. The process as claimed in claim 3, wherein the polydispersity of the polyolefin which is prepared with the metallocene is from 5.9 to 8.5.

* * * * *